United States Patent
Williams et al.

(10) Patent No.: US 10,060,342 B2
(45) Date of Patent: Aug. 28, 2018

(54) WELLHEAD GAS CONDITIONER METHODS AND USES THEREOF

(71) Applicant: GRANITEFUEL ENGINEERING INC., Concord (CA)

(72) Inventors: Shazam Williams, Toronto (CA); Linjie Hu, Vaughn (CA); Rajesh Parmar, Brampton (CA); John Muter, King City (CA)

(73) Assignee: Granitfuel Engineering Inc. (CA)

( * ) Notice: Subject to any disclaimer, the term of this patent is extended or adjusted under 35 U.S.C. 154(b) by 195 days.

(21) Appl. No.: 14/830,946

(22) Filed: Aug. 20, 2015

(65) Prior Publication Data

US 2017/0167367 A1    Jun. 15, 2017

Related U.S. Application Data

(60) Provisional application No. 62/043,507, filed on Aug. 29, 2014.

(51) Int. Cl.
*F02B 43/00* (2006.01)
*F02B 43/04* (2006.01)

(52) U.S. Cl.
CPC .................. *F02B 43/04* (2013.01)

(58) Field of Classification Search
CPC ..................................... F02B 43/04
See application file for complete search history.

(56) References Cited

U.S. PATENT DOCUMENTS

| | | | |
|---|---|---|---|
| 3,065,166 A | 11/1962 | Hennig | |
| 4,002,150 A | 1/1977 | Shinohara et al. | |
| 4,112,876 A | 9/1978 | Mentschel | |
| 4,131,086 A | 12/1978 | Noguchi et al. | |
| 8,528,334 B2 * | 9/2013 | Dutta | F23R 3/343 431/268 |
| 2002/0187088 A1 * | 12/2002 | Reimert | F02C 1/00 422/204 |
| 2007/0234715 A1 * | 10/2007 | Willi | F01N 5/02 60/320 |

OTHER PUBLICATIONS

International Search Report and Written Opinion of the International Searching Authority dated Nov. 4, 2015, corresponding to International Patent Application No. PCT/CA2015/050781, 9 pages.
Canadian Office Action, dated Dec. 15, 2017, in corresponding Canadian Application No. 2,956,765, 4 pages.

* cited by examiner

*Primary Examiner* — Cephia D Toomer
(74) *Attorney, Agent, or Firm* — Eric L. Sophir; Dentons US LLP

(57) ABSTRACT

The embodiments described herein are directed a device for conditioning gas comprising an inlet for receiving fuel. The device includes an injector for injecting an oxygen source into the fuel, a heating component for heating the fuel, a conditioner unit, and a cooling component. The device further comprises an outlet for feeding conditioned gas into an engine. The embodiments are also directed to a method for conditioning gas.

20 Claims, 6 Drawing Sheets

WELLHEAD GAS CONDITIONER METHODS AND USES THEREOF

CROSS-REFERENCE TO RELATED APPLICATIONS

This application claims priority to U.S. Provisional Patent Application Ser. No. 62/043,507, filed Aug. 29, 2014, which is hereby incorporated by reference in its entirety.

FIELD

The present disclosure relates to devices and methods for conditioning wellhead gas, associated petroleum gas, and/or high Btu content gas, and/or methane or natural gas comprising a high percentage of heavy hydrocarbons to make useful in engine systems.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

The present disclosure relates to a method of conditioning gas and a device for conditioning gas for use in engine systems.

Many oil and gas, industrial and manufacturing companies rely on engines that run off poor quality gas, such as wellhead gas, and/or high Btu content gas, associated petroleum gas, and/or methane or natural gas comprising a high percentage of heavy hydrocarbons to make useful in engine systems. Poor quality gas typically has a high energy content, which is typically measured in British thermal units (Btu), and has a low Methane Number (MN). For example, a gas station site utilizes an engine to drive a compressor that transports gas through the pipeline. The poor quality fuel prevents the engine from running at rated load and reduces the quantity of gas that can be transported. Thus, the engine becomes inefficient at high applied loads due to high exhaust temperatures and premature ignition or knock.

Knock is an abnormal combustion phenomenon that produces an audible sound. The pre-ignition of gas during the compression causes knock. The gas pre-ignition increases the pressure and temperature in the combustion chamber of the engine and cannot only lead to degradation and erosion of the material but also primarily results in poor engine performance. The occurrence of knock is dependent on many variables, including fuel properties. Therefore, there remains a definite need for a method of conditioning fuel gas with properties that avoid or eliminate knock.

SUMMARY

One embodiment provides a device for conditioning gas. The device comprises an inlet for receiving fuel. The device includes an injector for injecting an oxygen source into the first portion of fuel and a heating component for heating and cooling the first portion of fuel. The device includes a conditioning unit comprising at least one catalyst to oxidize the first portion of fuel into conditioned gas, and an outlet to feed a conditioned gas to an engine.

Another embodiment provides a method for conditioning gas. The method comprises the steps of:
a) receiving a fuel comprising at least one high hydrocarbon;
b) transferring a first portion of fuel to a conditioner unit;
c) injecting an oxygen source into the first portion of fuel;
d) heating the first portion of fuel with a heating component;
e) oxidizing the first portion of fuel in the conditioner unit comprising at least one catalyst to obtain a conditioned gas;
f) cooling the conditioned gas with a cooling component;
g) optionally, contacting the conditioned gas with a second portion of fuel comprising at least one high hydrocarbon; and
h) feeding the conditioned gas or a mixture of conditioned gas to an engine.

BRIEF DESCRIPTION OF THE DRAWINGS

These and other features of exemplary embodiments of the gas conditioning device, methods and uses thereof will now be described with reference to the drawings of certain embodiments which are intended to illustrate and not to limit the scope of the application.

DETAILED DESCRIPTION OF THE PREFERRED EMBODIMENTS

Further aspects, features and advantages will become apparent from the detailed description which follows.

As noted above, in its broader aspects, the embodiments are directed to a device for conditioning gas and a method for conditioning gas, as described above.

Unless otherwise indicated, the term "Methane Number" and/or "MN" means the percentage by volume of methane blended with hydrogen that matches the knock intensity of a gas mixture under specified operating conditions in a knock testing engine. The MN can be calculated by methods known to those of ordinary skill in the art.

Unless otherwise indicated, the term "high hydrocarbon" or "heavy hydrocarbon" means a straight chain, branched, and/or cyclic hydrocarbon having two or more carbon atoms.

Referring to the Figures, wherein like numerals indicate corresponding parts throughout the several views, a gas conditioning device 1 constructed in accordance with the subject invention is shown in FIGS. 1 to 6.

Fuel comprising at least one high hydrocarbon is received in the system at inlet 2. As a method of reducing energy expenditure, the pressure at inlet 2 can be in a range of 10 psig to 1200 psig, inclusive. Preferably in a range of 30 psig to 1000 psig. Most preferably in a range of 50 psig to 800 psig. In an exemplary embodiment, the pressure at inlet 2 is about 150 psig.

The fuel can be of any composition known to those of ordinary skill in the art to be compatible with an engine system. For instance, the fuel may further comprise carbon dioxide and other non-hydrocarbon components. The fuel may comprise a mixture of high hydrocarbons. In an exemplary embodiment, the fuel comprises 60% to 85% of methane by volume relative to the total volume of the composition, 5% to 20% of ethane by volume relative to the total volume of the composition, 4% to 10% of propane by volume relative to the total volume of the composition, 0.5% to 1% of i-butane by volume relative to the total volume of the composition, 0.5% to 4% of n-butane by volume relative to the total volume of the composition, 0.2% to 0.5% of i-pentane by volume relative to the total volume of the composition, 0.3% to 1% of n-pentane by volume relative to the total volume of the composition, and 0.2% to 2% of hexane by volume relative to the total volume of the composition. Optionally, the fuel further comprises $CO_2$ in a range of 0.25% to 3% by volume relative to the total volume of the composition. Optionally, the fuel further comprises $N_2$ in a range of 0.1% to 5% by volume relative to the total volume of the composition. In an exemplary embodiment, the fuel has a methane number in the range of 45 to 75. In another exemplary embodiment, the fuel has a lower heating value in the range of 1000 to 3000 Btu/scf.

Once the fuel is received, it travels through the system through line 3. The fuel intake pressure is optionally regulated by valve 4. To reduce energy expenditure, the pressure at the inlet can be maintained between 5 psig and 200 psig, inclusive. In an exemplary embodiment, the pressure at the inlet is about 135 psig.

A first portion of the fuel continues to flow through line 7 to undergo partial oxidation and reformation reactions. Optionally, a second portion of fuel travels through split line 5. In an exemplary embodiment, the first portion of fuel is 20% to 100% of the fuel introduced into the system at inlet 2. Optionally, the flow rate of the second portion of fuel at split line 5 is controlled using control valve 6.

An oxygen source is injected into the first portion of fuel gas at injection point 10 by various means. In one aspect of the invention, after injection of the oxygen source, the fuel comprises an oxygen-to-carbon ratio ($O_2/C$ ratio) of 0 to 0.2, inclusive. Preferably the $O_2/C$ ratio is 0.01:1 to 0.1:1, inclusive. Examples of the oxygen source include atmospheric air, exhaust gas from an engine and/or water. Injector point 10 could be a venturi and/or a simple mixing Tee joint. The venturi, also known as a venturi-ejector or an ejector or a jet compressor, injects gaseous reactants into the device. The simple mixing Tee joint injects the oxygen source via a compressor or a pump. The amount of the oxygen source can be controlled using a control valve 9 to achieve desired $O_2/C$ ratio. In an exemplary embodiment, the oxygen source is at least one gaseous reactant that is injected via a venturi. The gaseous reactants, most preferred, are injected via a venturi that utilizes the high pressure energy of the fuel to create enough suction and compresses the mixed gas to the desired pressure. The operation of the venturi is more or less similar to that of the carburetor. The venturi is a substitute to a compressor, which requires the power to inject the low pressure reactants into the high pressure fuel gas. A venturi is a completely mechanical unit, which avoids the power required as well as limits the reactant flow to the maximum designed condition. Specifically, the size of the throat, plays an important role in selecting the maximum limit for the oxygen-to-carbon ratio, which is an important process parameter. Also the pressure of the conditioned gas fed into the engine is determined by the design and the selection of the right kind of venturi. The desired $O_2/C$ ratio can be regulated either by the design of the venturi or by the intake control system on the reactant feed. An $O_2/C$ ratio of 0 to 0.2, most preferably 0 to 0.1, is achieved with the combination of a correct size venturi and control system together. Motive gas pressure varies from 90 psig to 1000 psig, and reactant pressure varies from 0 psig to 15 psig. A discharge pressure of from 5 psig to 45 psig is achieved by selecting the right size of the venturi. Intake filter and silencer controls the particulate matter entering the system and noise respectively. In an exemplary embodiment, 10 psig to 300 psig, most preferable 90 psig to 150 psig, motive gas pressure with discharge pressure of 5 psig to 50 psig $O_2/C$ ratio can be controlled from 0 to 0.2 and most preferably between 0 to 0.1.

The temperature of the first portion of fuel is increased by heating component 11. In an exemplary embodiment, the heating component 11 is a heat exchanger. The heat exchanger can comprise a heating fluid. When the engine exhaust is greater than 570° F., it is preferable for the heating fluid to be an engine exhaust gas. In another embodiment, the heating component is an electric heater. In an exemplary embodiment, the temperature of the fuel at heat exchanger 11 is in the range of 550° F. to 850° F., inclusive.

The first portion of fuel is oxidized in conditioner unit 12, which comprises at least one catalyst, to obtain a conditioned gas having high MN and low Btu. In one aspect of the invention, the catalyst comprises aluminum, lanthanum, cerium, rhodium, and mixtures thereof. In an exemplary embodiment, the catalyst comprises 70% to 90% of alumina by weight relative to the total weight of the composition, 2% to 3% of lanthanum by weight relative to the total weight of the composition, 0.5% to 5% of cerium by weight relative to the total weight of the composition, and 0.5% to 5% of rhodium by weight relative to the total weight of the composition. Optionally, the temperature of the fuel at the conditioner unit is in the range of 550° F. to 1500° F., inclusive.

Figure 1:
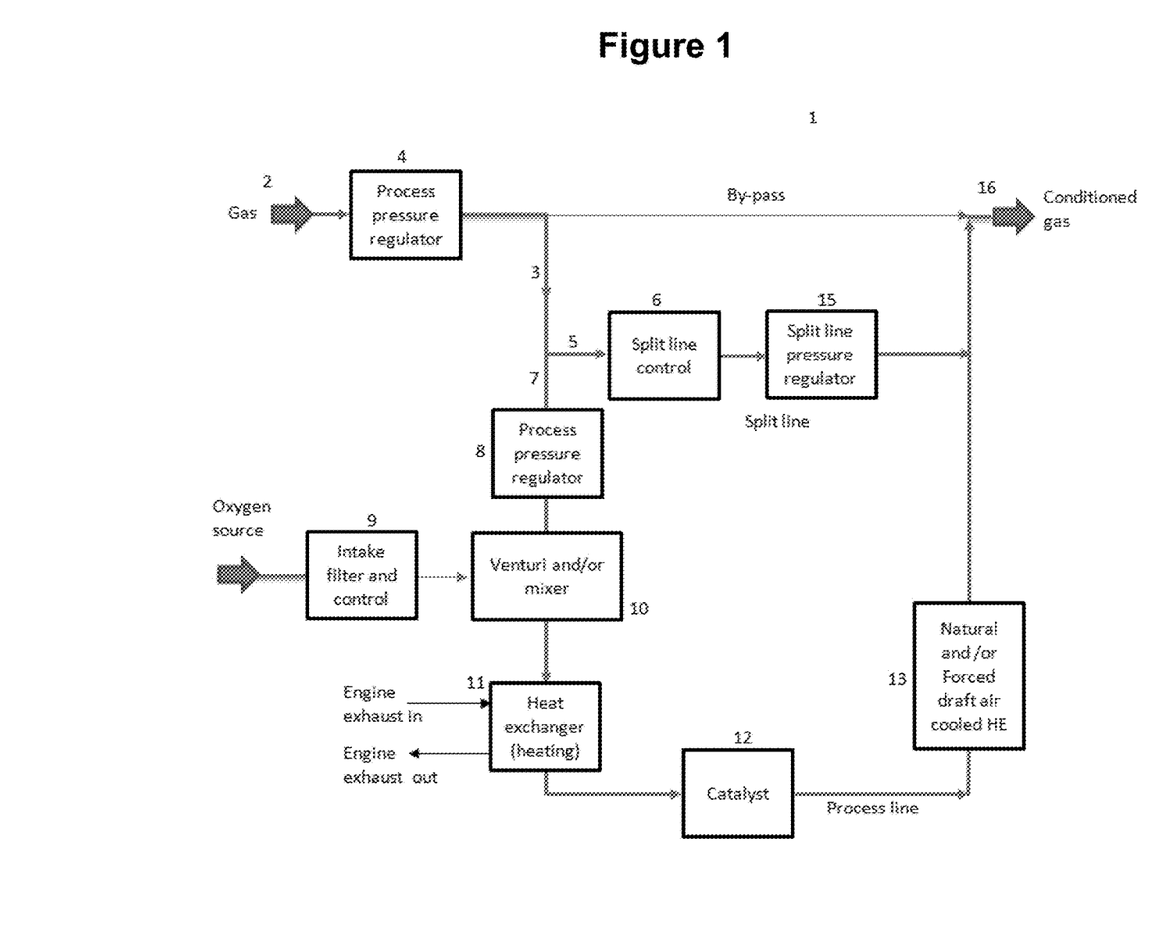
FIG. 1 is an illustration of a wellhead gas conditioning system.
Figure 2:
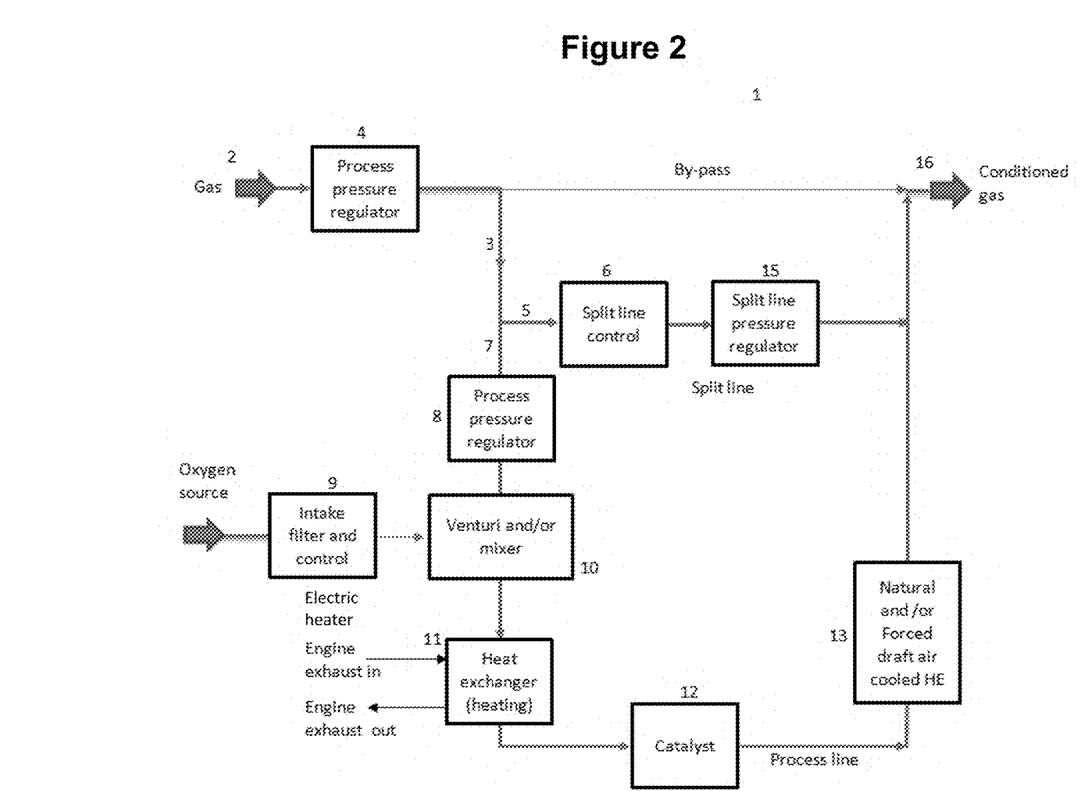
FIG. 2 is an illustration of an embodiment of a wellhead gas conditioning system with an electric heater.
Figure 3:
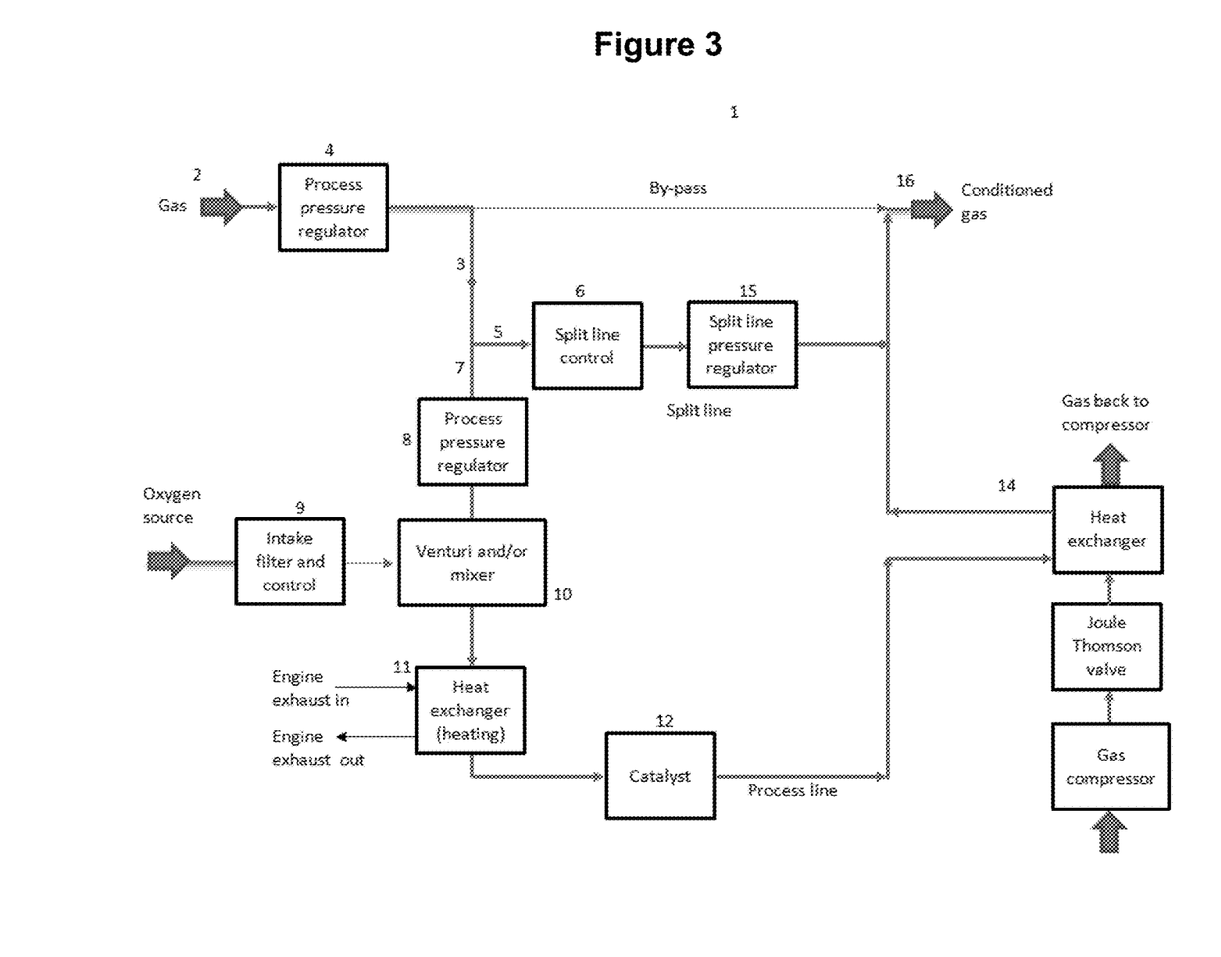
FIG. 3 is an illustration of an alternative embodiment of a wellhead gas conditioning system.
Figure 4:
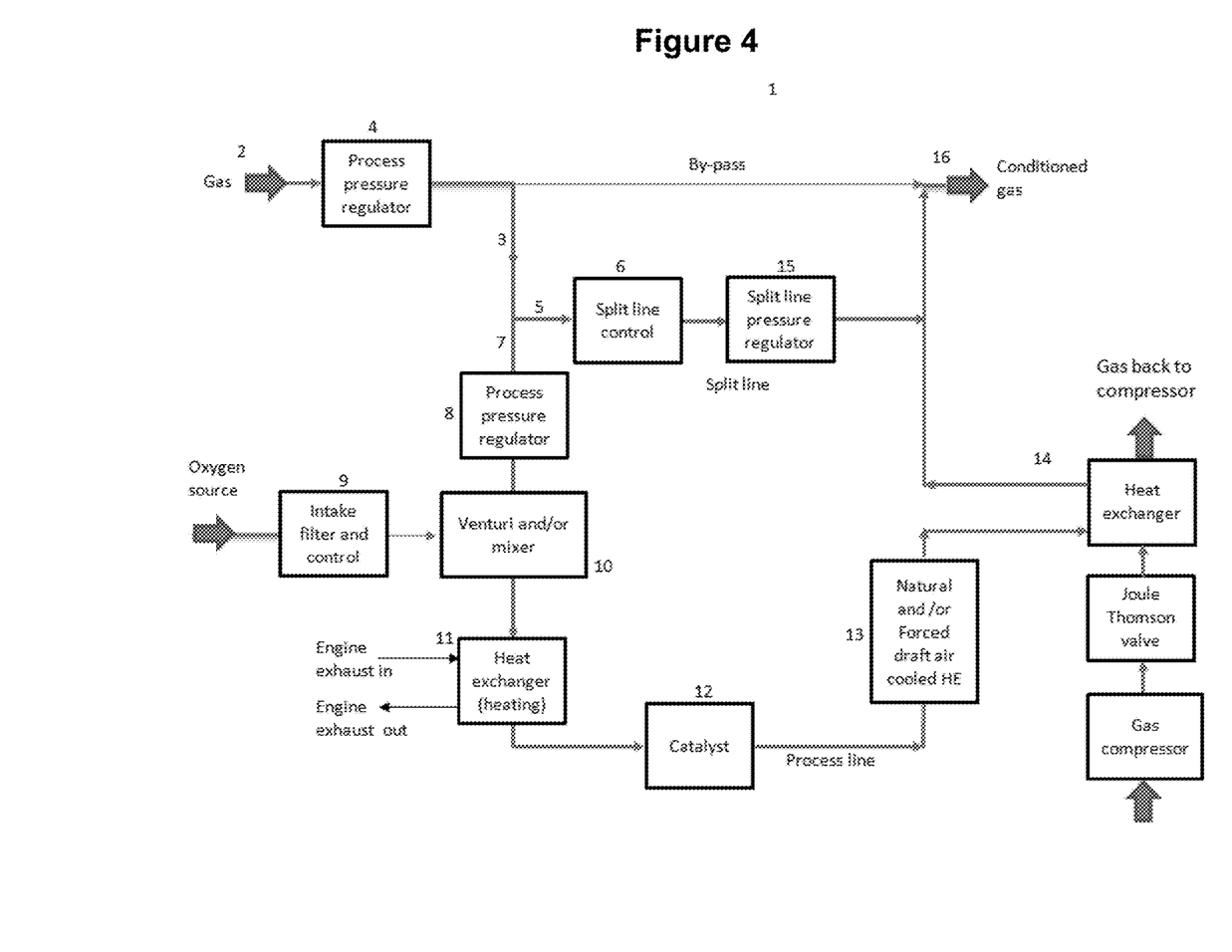
FIG. 4 is an illustration of yet another alternative embodiment of a wellhead gas conditioning system.

The conditioned gas is cooled by a cooling means. As a non-limiting example, the cooling component can be a single heat exchanger or a series of heat exchangers. The cooling component can be any heat exchange device known to those of ordinary skill in the art. In an exemplary embodiment, the cooling component is an air cooled heat exchanger 13. In yet another exemplary embodiment, FIG. 3 illustrates the conditioned gas is cooled with a shell and tube heat exchanger 14. FIG. 3 illustrates an embodiment in which the cooling component is a series of heat exchangers. Specifically, FIG. 3 illustrates a series of heat exchangers comprising an air cooled heat exchanger 13 and a shell and tube heat exchanger 14. When the cooling component comprises a shell and tube heat exchanger, cooling can be obtained by either the Joule Thomson effect or with a cooling fluid, such as engine coolant. When the cooling component comprises an air cooled heat exchanger, the air cooled heat exchanger can be a forced draft air cooled heat exchanger, a natural draft air cooled heat exchanger, or a combination of both.

Optionally, the conditioned gas and the second portion of fuel after the pressure regulator 15 contact to further cool the conditioned gas.

Figure 5:
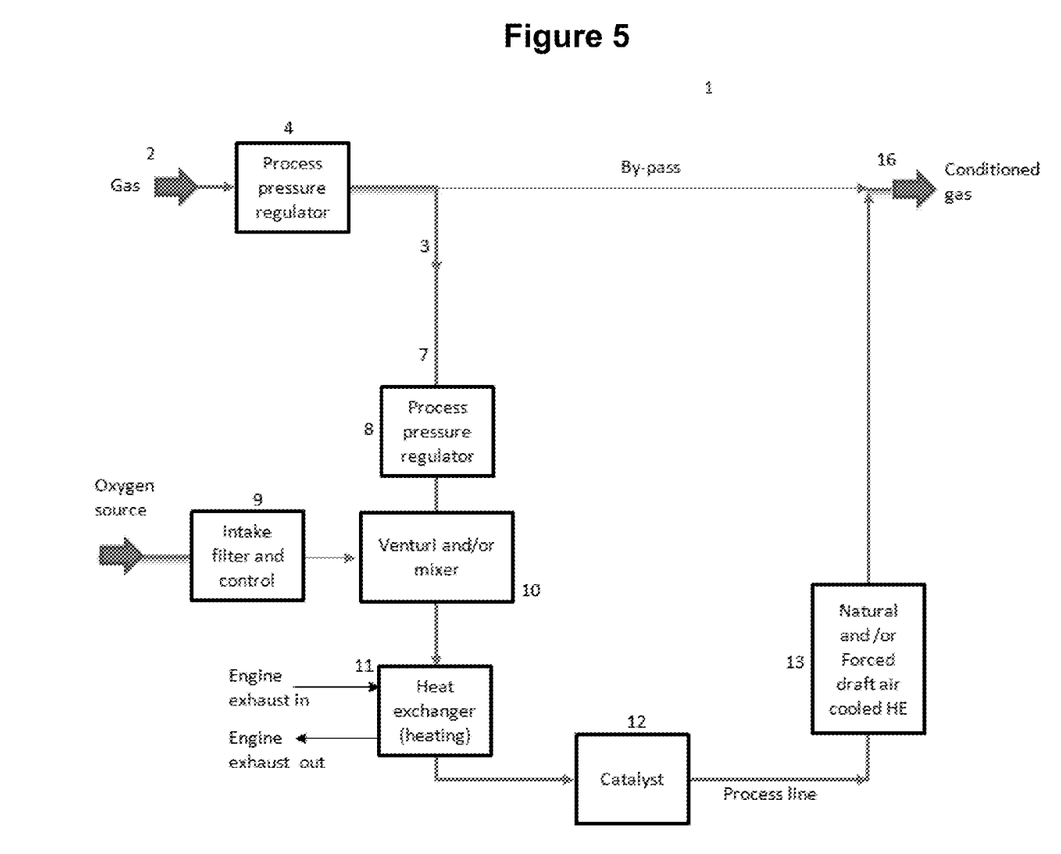
FIG. 5 is an illustration of a further alternative embodiment of a wellhead gas conditioning system.
Figure 6:
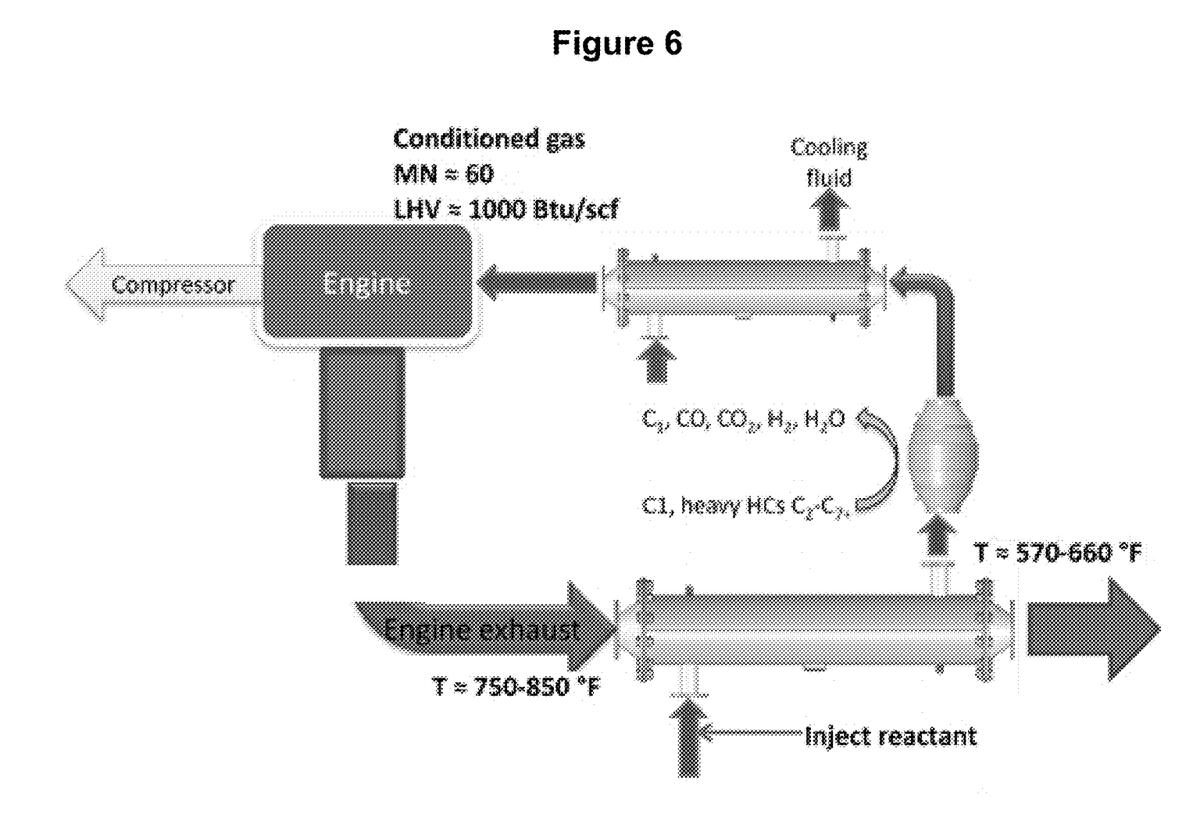
FIG. 6 is an illustration of a wellhead gas conditioning system overview.

The conditioned gas is fed to an engine at outlet 16. In an exemplary embodiment, the conditioned gas that is fed to the engine has higher methane number and lower heating value than that of unconditioned gas. In yet another exemplary embodiment, as illustrated in FIG. 5, the fuel is fed into the engine at a temperature of less than 130° F. In an additional exemplary embodiment, the fuel is fed into the engine at a temperature of less than 120° F. The pressure at the outlet can be between 2 psig and 60 psig, inclusive. In one aspect, the fuel is fed into the engine at a pressure of about 15 psig.

Accordingly, another aspect provides a method of conditioning gas comprising the following steps:
 a) receiving fuel comprising at least one high hydrocarbon;
 b) transferring a first portion of the fuel to a conditioner unit;
 c) injecting an oxygen source into the first portion of fuel;
 d) heating the first portion of fuel with heating component;
 e) oxidizing the first portion of fuel in the conditioner unit comprising at least one catalyst to obtain a conditioned gas;
 f) cooling the conditioned gas with cooling component;
 g) optionally, contacting the conditioned gas with a second portion of fuel comprising at least one high hydrocarbon; and
 h) feeding the conditioned gas or a mixture of conditioned gas and the second portion of fuel to an engine.

More specifically, the method proceeds by receiving a fuel comprising at least one high hydrocarbon and optionally any other non-hydrocarbon component known to one of ordinary skill in the art to be compatible with gas conditioning systems. The fuel may comprise a mixture of high hydrocarbons. In an exemplary embodiment, the fuel according to the exemplary method comprises 60% to 85% of methane by volume relative to the total volume of the composition, 5% to 20% of ethane by volume relative to the total volume of the composition, 4% to 10% of propane by volume relative to the total volume of the composition, 0.5% to 1% of i-butane by volume relative to the total volume of the composition, 0.5% to 4% of n-butane by volume relative to the total volume of the composition, 0.2% to 0.5% of i-pentane by volume relative to the total volume of the composition, 0.3% to 1% of n-pentane by volume relative to the total volume of the composition, and 0.2% to 2% of hexane by volume relative to the total volume of the composition. In a further aspect of the method according to the invention, the fuel further comprises $CO_2$ in a range of 0.25% to 3% by volume relative to the total volume of the composition. In yet another aspect of the invention, the fuel comprises $N_2$ in a range of 0.1% to 5% by volume relative to the total volume of the composition. Optionally, the fuel has a methane number in the range of 45 to 75. Optionally, the fuel has a lower heating value in the range of 1000 to 3000 Btu/scf.

Optionally, the method continues by separating the fuel into a first portion and second portion. This is achieved by transferring a first portion of fuel to a conditioner unit. In an exemplary embodiment, the first portion of fuel is 20% to 100% of the fuel received in step a). Optionally, the flow rate and pressure of the first and second portion of fuel in step b) are measured. Optionally the pressure at step a) is about 150 psig.

The method further comprises injecting an oxygen source into the first portion of fuel. The oxygen source can be known reactants such as air, water, engine exhaust gas, and mixtures thereof. In an exemplary embodiment the oxygen source is a gaseous mixture that is injected via a venturi.

The exemplary method includes the step of heating the first portion of fuel in a heating component, such as a heat exchanger or an electric heater. In an exemplary embodiment, the fuel is heated to a range of 550° F. to 850° F., inclusive.

The method continues by oxidizing the first portion of fuel in a conditioner unit comprising at least one catalyst to obtain a conditioned gas having high MN and low Btu. The catalyst can comprise aluminum, lanthanum, cerium, rhodium, and mixture thereof. In an exemplary embodiment, the catalyst comprises 70% to 90% of alumina by weight relative to the total weight of the composition, 2% to 3% of lanthanum by weight relative to the total weight of the composition, 0.5% to 5% of cerium by weight relative to the total weight of the composition, and 0.5% to 5% of rhodium by weight relative to the total weight of the composition. Optionally, the temperature at step e) is in the range of 550° F. to 1500° F., inclusive.

The method progresses by cooling the conditioned gas with a cooling component. The cooling component can be a single heat exchanger or a series of heat exchangers. In an exemplary embodiment, the cooling component is an air cooled heat exchanger or a shell and tube heat exchanger.

Optionally, the method further comprises contacting the conditioned gas with the second portion of fuel comprising at least one hydrocarbon that was separated in step b).

The method of conditioning gas optionally includes the step of feeding the conditioned gas from step f) or a mixture of the conditioned gas and the second portion of fuel from step g) to an engine. In an exemplary embodiment, the mixture that is fed to the engine has a higher methane number and a lower heating value than that of the conditioned gas. In yet another exemplary embodiment, the fuel is fed into the engine at a temperature of less than 130° F. In an additional exemplary embodiment, the fuel is fed into the engine at a temperature of less than 120° F. Optionally, the pressure at step h) is between 2 psig and 60 psig, inclusive. In an exemplary embodiment, the fuel is fed into the engine at a pressure of about 15 psig.

While elements of the invention have been described, it will be appreciated by those of ordinary skill in the art that modifications can be made to the device and method of the invention without departing from the spirit and scope of the invention as a whole.

The device and method described herein are intended to encompass the components and steps, which consist of, consist essentially of, as well as comprise, the various constituents identified herein, unless explicitly indicated to the contrary.

Any numbers expressing quantities of ingredients, constituents, reaction conditions, and so forth used in the specification are to be interpreted as encompassing the exact numerical values identified herein, as well as being modified in all instances by the term "about." Unless otherwise indicated, all ranges described herein are inclusive of the minimum and maximum values recited in the range. Notwithstanding that the numerical values set forth are indicated as precisely as possible. Any numerical value, however, may inherently contain certain errors or inaccuracies as evident from the standard deviation found in their respective measurement techniques. None of the features recited herein should be interpreted as invoking 35 U.S.C. § 112, paragraph 6, unless the term "means" is explicitly used.

What is claimed is:

1. A method of conditioning gas, said method comprising the steps of:
 (a) receiving fuel comprising at least one high hydrocarbon;
 (b) transferring a first portion of the fuel to a conditioner unit;
 (c) injecting an oxygen source into the first portion of fuel;

(d) heating the first portion of fuel with a heating component;

(e) oxidizing the first portion of fuel in the conditioner unit comprising at least one catalyst to obtain a conditioned gas;

(f) cooling the conditioned gas with a cooling component;

(g) optionally, contacting the conditioned gas with a second portion of fuel comprising at least one high hydrocarbon; and (h) feeding the conditioned gas or a mixture of conditioned gas and the second portion of fuel to an engine;

(i) further wherein the at least one catalyst comprises 70% to 90% of alumina by weight relative to the total weight of the composition, 2% to 3% of lanthanum by weight relative to the total weight of the composition, 0.5% to 5% of cerium by weight relative to the total weight of the composition, and 0.5% to 5% of rhodium by weight relative to the total weight of the composition.

2. The method according to claim 1, wherein at step f) the cooling component is a series of heat exchangers.

3. The method according to claim 1, wherein the oxygen source is air, water, an engine exhaust gas, or mixtures thereof.

4. The method according to claim 1, wherein the cooling component is an air cooled heat exchanger or a shell and tube heat exchanger.

5. The method according to claim 1, wherein the first portion of fuel is between 20% to 100%, inclusive, of said fuel comprising at least one high hydrocarbon.

6. A method of conditioning gas, said method comprising the steps of:

(a) receiving fuel comprising at least one high hydrocarbon;

(b) transferring a first portion of the fuel to a conditioner unit (c) injecting an oxygen source into the first portion of fuel;

(d) heating the first portion of fuel with a heating component (e) oxidizing the first portion of fuel in the conditioner unit comprising at least one catalyst to obtain a conditioned gas;

(f) cooling the conditioned gas with a cooling component;

(g) optionally, contacting the conditioned gas with a second portion of fuel comprising at least one high hydrocarbon; and (h) feeding the conditioned gas or a mixture of conditioned gas and the second portion of fuel to an engine, wherein the fuel comprises:

60% to 85% of methane by volume relative to the total volume of the composition, 5% to 20% of ethane by volume relative to the total volume of the composition, 4% to 10% of propane by volume relative to the total volume of the composition, 0.5% to 1% of i-butane by volume relative to the total volume of the composition, 0.5% to 4% of n-butane by volume relative to the total volume of the composition, 0.2% to 0.5% of i-pentane by volume relative to the total volume of the composition, 0.3% to 1% of n-pentane by volume relative to the total volume of the composition, 0.2% to 2% of hexane by volume relative to the total volume of the composition, 0.25% to 3% of $CO_2$ by volume relative to the total volume of the composition, and 0.1% to 5% of N2 by volume relative to the total volume of the composition.

7. The method according to claim 1, wherein the fuel comprises an oxygen-to-carbon ratio ($O_2$/C ratio) in the range of 0 to 0.2, inclusive.

8. The method according to claim 1, wherein the pressure at step a) is between 10 psig and 1200 psig, inclusive.

9. The method according to claim 8, wherein the pressure at step a) is about 150 psig.

10. The method according to claim 1, wherein the pressure at step h) is between 2 psig and 60 psig, inclusive.

11. The method according to claim 10, wherein the pressure at step h) is about 15 psig.

12. The method according to claim 1, wherein the temperature at step d) is in the range of 550° F. to 850° F., inclusive.

13. The method according to claim 1, wherein the temperature at step e) is in the range of 700° F. to 1000° F., inclusive.

14. The method according to claim 1, wherein the temperature at step h) is less than 130° F.

15. The method according to claim 14, wherein the temperature at step h) is less than or equal to 120° F.

16. The method according to claim 6, wherein the fuel comprises an oxygen-to-carbon ratio ($O_2$/C ratio) in the range of 0 to 0.2, inclusive.

17. The method according to claim 6, wherein the pressure at step (a) is between 10 psig and 1200 psig, inclusive.

18. The method according to claim 6, wherein the pressure at step (h) is between 2 psig and 60 psig, inclusive.

19. The method according to claim 1, wherein the temperature at step (d) is in the range of 550° F. to 850° F., inclusive.

20. The method according to claim 1, wherein the temperature at step (e) is in the range of 700° F. to 1000° F., inclusive.

* * * * *